US007660890B2

(12) United States Patent
Banerjee

(10) Patent No.: US 7,660,890 B2
(45) Date of Patent: *Feb. 9, 2010

(54) RFID EDGE SERVER WITH SOCKET MULTIPLEXING

(75) Inventor: Ashok Banerjee, Fremont, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/232,622

(22) Filed: Sep. 22, 2005

(65) Prior Publication Data

US 2007/0044092 A1  Feb. 22, 2007

Related U.S. Application Data

(60) Provisional application No. 60/710,243, filed on Aug. 22, 2005.

(51) Int. Cl.
*G06F 15/173* (2006.01)
(52) U.S. Cl. ........... 709/224; 370/352; 340/572.1
(58) Field of Classification Search ................ 709/224
See application file for complete search history.

(56) References Cited

U.S. PATENT DOCUMENTS

| | | | |
|---|---|---|---|
| 6,317,028 B1 * | 11/2001 | Valiulis ................ 340/10.1 |
| 6,739,511 B2 * | 5/2004 | Tsikos et al. ............ 235/462.01 |
| 6,854,069 B2 * | 2/2005 | Kampe et al. .................. 714/4 |
| 6,874,020 B1 * | 3/2005 | Da Palma et al. ........... 709/223 |
| 7,051,105 B2 | 5/2006 | Lauzon et al. |
| 7,062,540 B2 * | 6/2006 | Reddy et al. ................ 709/217 |
| 7,073,191 B2 | 7/2006 | Srikantan |
| 7,267,275 B2 * | 9/2007 | Cox et al. .................... 235/451 |
| 7,317,394 B2 * | 1/2008 | Koh et al. ................ 340/572.1 |
| 7,355,601 B2 * | 4/2008 | Andrews et al. ............ 345/505 |
| 7,394,377 B2 * | 7/2008 | Banerjee .................. 340/572.1 |
| 2002/0145042 A1 * | 10/2002 | Knowles et al. ........ 235/462.01 |
| 2003/0019933 A1 * | 1/2003 | Tsikos et al. ................ 235/454 |
| 2003/0034387 A1 * | 2/2003 | Knowles et al. ............. 235/375 |
| 2003/0043042 A1 * | 3/2003 | Moores et al. ........... 340/573.1 |
| 2003/0144926 A1 * | 7/2003 | Bodin et al. .................. 705/28 |
| 2004/0087273 A1 * | 5/2004 | Perttila et al. .............. 455/41.2 |
| 2004/0138989 A1 * | 7/2004 | O'Malley et al. ............. 705/37 |
| 2004/0181476 A1 | 9/2004 | Smith |
| 2004/0230488 A1 * | 11/2004 | Beenau et al. ................ 705/18 |
| 2004/0264441 A1 * | 12/2004 | Jalkanen et al. ............. 370/352 |
| 2005/0252971 A1 | 11/2005 | Howarth et al. |
| 2005/0253722 A1 * | 11/2005 | Droms et al. ............. 340/572.1 |
| 2006/0091999 A1 | 5/2006 | Howarth |
| 2006/0108411 A1 * | 5/2006 | Macurek et al. ............. 235/375 |
| 2006/0209868 A1 | 9/2006 | Callaghan |
| 2006/0229928 A1 * | 10/2006 | Nix ................................ 705/9 |
| 2006/0250248 A1 * | 11/2006 | Tu et al. .................. 340/572.4 |
| 2007/0027966 A1 * | 2/2007 | Singhal et al. .............. 709/220 |
| 2008/0042807 A1 * | 2/2008 | Park et al. .................. 340/10.3 |

* cited by examiner

*Primary Examiner*—Firmin Backer
*Assistant Examiner*—Hamza Algibhah
(74) *Attorney, Agent, or Firm*—Fliesler Meyer LLP

(57) ABSTRACT

An RFID (Radio Frequency Identification) edge server associates with multiple RFID readers at a location. The RFID edge server includes an application server to run applications. The RFID edge server having TCP/IP socket connections with the multiple RFID readers. The RFID edge server having a fewer access threads for the RFID readers than there are socket connections.

17 Claims, 12 Drawing Sheets

RFID EDGE SERVER WITH SOCKET MULTIPLEXING

CLAIMS OF PRIORITY

This application claims priority to U.S. Provisional Application No. 60/710,243 entitled "RFID Edge Server" by Ashok Banjerjee, filed Aug. 22, 2005.

BACKGROUND OF INVENTION

The present invention relates to Radio Frequency Identification (RFID) technology. Radio Frequency Identification technology is becoming more and more important, especially to manage supply chains.

Radio Frequency Identification technology can allow for the tracking of objects using RFID tags and RFID readers. RFID readers can interrogate the RFID tags using radio waves. The RFID tag typically includes an antenna and a microchip that stores a response code. The majority of RFID tags use a silicon microchip to store a unique serial number, such as an electronic product code (EPC), and usually some additional information. The reader can pass the response code to a computer system to track the objects.

There are two main categories of RFID systems, passive and active systems. Passive RFID tags do not have a transmitter but simply reflect back energy to the reader. Active tags have their own transmitter and power source, such as a battery. Active RFID systems are typically used for a tracking large items since the active RFID tags are relatively expensive.

Because passive RFID tags do not use a power source and transmitter, they tend to be cheaper than the active RFID tags. Retailers and manufacturers are adding the passive tags to items in the supply chain. RFID systems can significantly reduce the cost of managing inventory.

Passive RFID tags allow for the possibility of tracking of cartons of materials as they enter and exit entry points of a warehouses and stores. As the passive RFID tags become cheaper, ultimately individual packages can have their own RFID tags and thus the inventory can be tracked very precisely. Additionally, since the RFID technology does not rely on line-of-sight operation, a shopping cart full of goods with RFID tags can be scanned without requiring the goods to be removed from the cart.

In one embodiment, RFID tags can be used to implement an electronic product code (EPC). The EPC is a unique number used to identify specific objects in the supply chain. EPC information services (EPCIS) can enable users to exchange EPC related data with trading partners throughout the EPC network.

DETAILED DESCRIPTION

Figure 1:
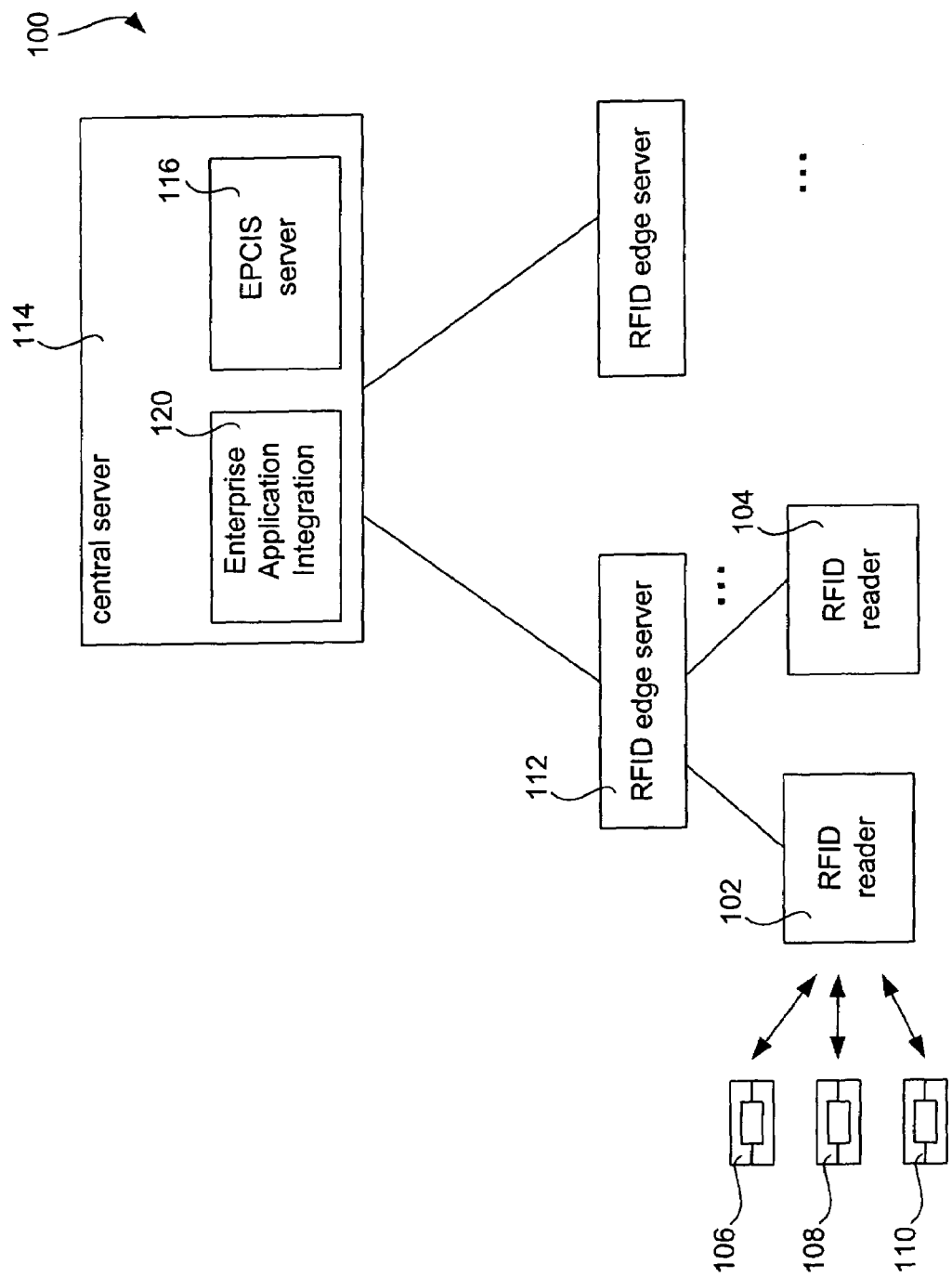
FIG. 1 is a diagram of an RFID system of one embodiment.

FIG. 1 illustrates a RFID system 100. RFID readers 102 and 104 can be used to interrogate RFID tags 106, 108 and 110. Data from the RFID tags, such as EPC codes, can be read by the RFID reader and provided to an RFID edge server 112. Typically, the RFID readers 102 and 104 are constantly interrogating for responses from the RFID tags 106, 108 and 110. The RFID edge server 112 can thus receive a large number of duplicative responses. RFID edge server 112 can send event reports to the central server 114. The central server 114 can include a EPCIS server 116 and enterprise application integration software 120.

The RFID edge server can be used to provide RFID reader management, filtering, commissioning, and connectivity. As disclosed below, in one embodiment the RFID edge server 102 can include application server, such as a J2EE application server. J2EE applications servers can run J2EE applications. J2EE applications can be made up of components. A J2EE component can be a self-contained functional software unit that is assembled into a J2EE application with its related classes and files and that communicates with other components. The J2EE specification defines the following J2EE components:

Application clients and applets are components that run on the client.

JAVA™ Servlet and JAVAServer Pages™ (JSP™) technology components are web components that run on the server.

Enterprise JAVABeans™ (EJB™) components (enterprise beans) are business components that run on the server.

J2EE components can be written in the JAVA™ programming language and can be compiled in the same way as any program in the language. In one embodiment, The difference between J2EE components and "standard" JAVA™ classes is that J2EE components are assembled into a J2EE application, are verified to be well formed and in compliance with the J2EE specification, and are deployed to production, where they are run and managed by the J2EE server.

In one embodiment, the application server is the WebLogic Server™ available from BEA Systems, Inc., of San Jose, Calif.

The application server can run a RFID edge server infrastructure itself as a J2EE application. RFID edge server application can include J2EE components and be packaged in an archive file such as a (JAVA™ Archive) JAR file or a Web Archive (WAR) file The use of an application server at the RFID edge server can provide a number of advantages. The application server components can include:

JAVA™ Messaging Server (JMS) to provide guaranteed message delivery and once message processing Security to prevent unauthorized access. The security module can be able to plug into 3$^{rd}$ party software and can utilize the secured socket layer (SSL) protocol.

Administration to manage the RFID edge server. Administration can include JMX administration and can be able to aggregate views and configure the RFID edge server.

Web services to receive and respond to web service requests.

The RFID edge server can provide for RFID data filtering and business rules. The RFID edge server can work with a variety of RFID readers. Applications can interact with an RFID edge server through an Application-Level Events (ALE) interface. ALE can provide a way for developers to define high-level events that are needed by specific customer enterprise applications. Enterprise applications receive incoming data in formats designed for easy integration and can obtain RFID data without requiring programmers to interact directly with RFID readers or to perform any low-level real-time processing or scheduling.

Figure 10:
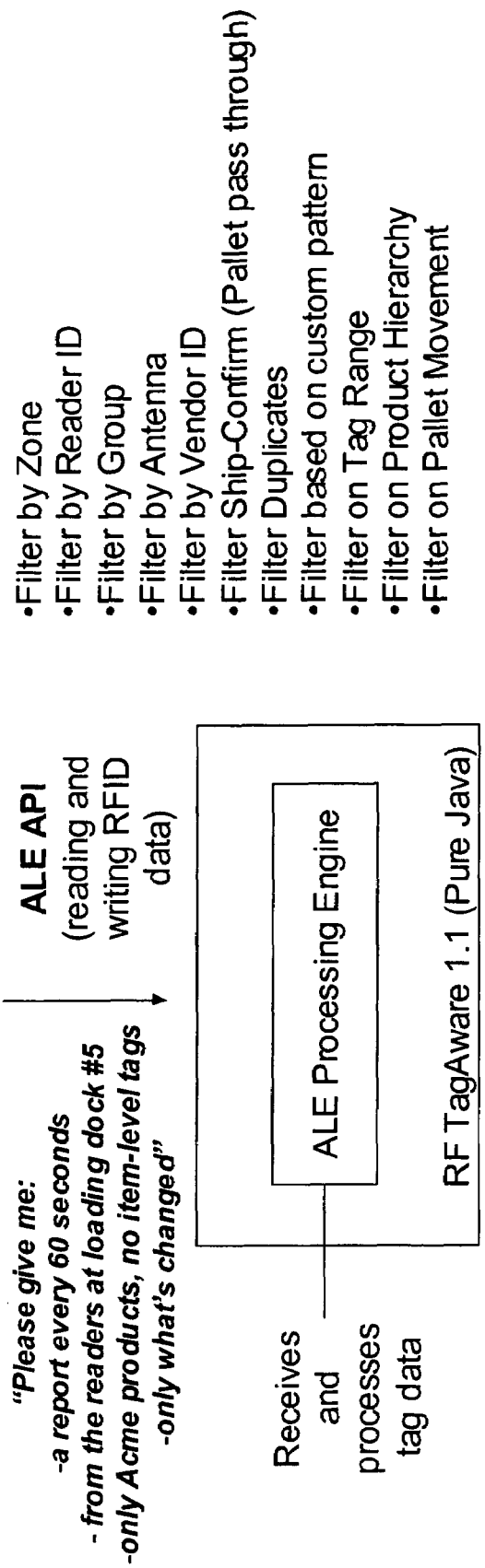
FIG. 10 is a diagram that illustrates an ALE processing engine.

FIG. 10 illustrates an ALE processing engine that can be run at an application server at an RFID edge server. FIG. 10 also shows common ALE filters.

Application-Level Events (ALE) defines an interface through which an application could indicate exactly what information it wants from the raw stream of RFID reads. Through ALE, an application can specify a number of things:

Which locations it wants to read from
What interval of time to accumulate data
How to filter the data
How to group the results
Whether to report currently visible tags or just additions or deletions
Whether to report actual EPCs or just a count of the tags that are read.

A request of this kind may be made in an on-demand mode, where the reads are performed in response to an application request, or as a standing request, where data is sent to the application periodically without further request.

An RFID application can make a high-level request for data through the ALE interface, and the hardware or software on the other side of the ALE interface fulfills the request. ALE shields applications from low-level implementation detail.

Another benefit for end users is that ALE facilitates sharing RFID data among many applications simultaneously. Different applications may make requests through the ALE interface, without requiring those applications to have knowledge of each other. If two applications request data from the same reader, the implementation of ALE mediates those requests and makes sure that each application receives the data it needs. Using ALE each RFBD can interact with a number of applications rather than be just a dedicated peripheral for a specific application.

The EPC Information Service (EPCIS) is a specification for a standard interface for accessing EPC-related information. Because an Electronic Product Code (EPC) gives each object a unique serial number, each individual object can be tracked independently and fine-grained real-time information about each individual object can be collected, stored and acted upon. EPC Information Services are a way for supply chain partners to share and exchange information efficiently, because a standard interface allows trading partners to use the same functions or methods for querying data across the supply chain, leading to reduced times integrating with partners if everyone uses the same interface, even though they may store the information in different types of underlying databases.

EPC Information Service is a technical specification for a data communication interface. EPC Information Services are designed to support both on-demand polling access and a 'push' model supporting standing queries. Depending on how the security for each individual EPCIS implementation is configured, you might be granted the right to define your own standing queries—or you might only have the option of 'subscribing' to an existing query which was pre-defined by the owner or provider of a particular EPCIS service.

EPC-related Data can include:

1. timestamped event data collected throughout the lifecycle of an object e.g. Observations (low-level tag readings), Measurements (sensor data, e.g. temperature history), Containment History, Higher-level Location History, Associations with Business Transactions.
2. quasi-static attributed data defined at serial-level but not continuously updated e.g. Date of Manufacture, Date of Expiry, Custom Configuration etc.

The EPC Information Service lies at the top layer of the EPC Network technology stack. EPCIS can allow business logic to be mixed with read 'events' coming from RFID readers. The layers underneath EPCIS (e.g. Filtering & Collection [ALE], Reader Protocol etc.) can be primarily concerned with simple triples of data (Reader, Tag EPC, timestamp). EPCIS allows for higher-level meanings to be stored or accessed, involving business processes and business transactions.

The EPC Information Service Specification can specify the standard interfaces for:

Query (getting data from an EPCIS)
Capture (putting data into an EPCIS)

The EPCIS interface can be implemented as an EPCIS server. In terms of implementing an EPC Information Service, you can choose to either host your own EPCIS interface coupled to your existing databases for serial level data or subscribe to a technology solution provider hosting a managed EPCIS service.

Trading partners may be able to find an EPCIS by using the Object Name Service (ONS), doing a lookup based on the EPC of your products. Serial-level pointers can also be stored securely within registries called Discovery Services. Discovery Service registries can be updated by each custodian on handover, with serial-level EPC lookup.

Figure 11:
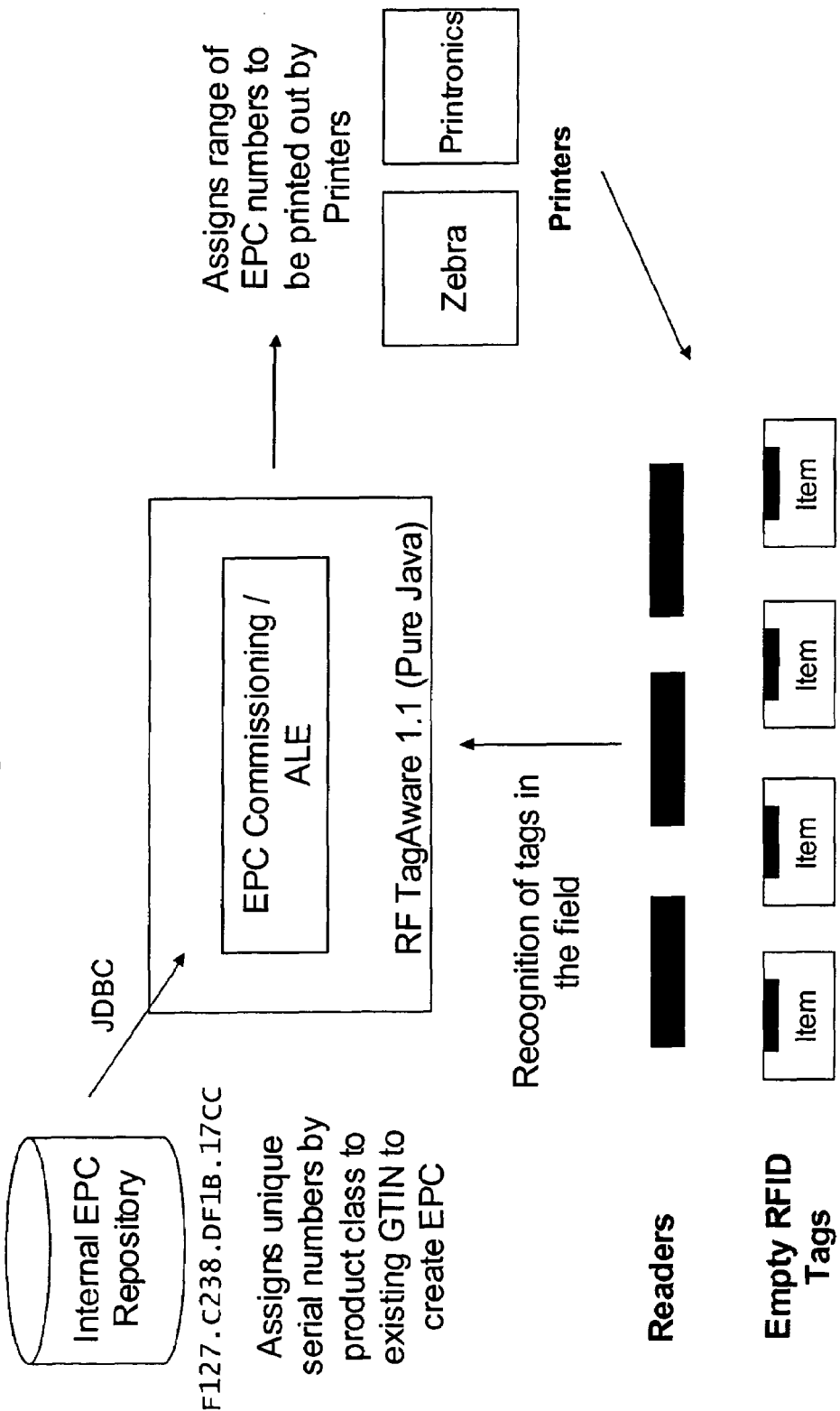
FIG. 11 is a diagram that illustrates the EPC commissioning process.

FIG. 11 shows an example of EPCIS commissioning as a J2EE application that can run on an application server at an application server at an EPCIS server. Alternately, some of the EPCIS functions can be run at an application server at an RFID edge server.

Figure 2:
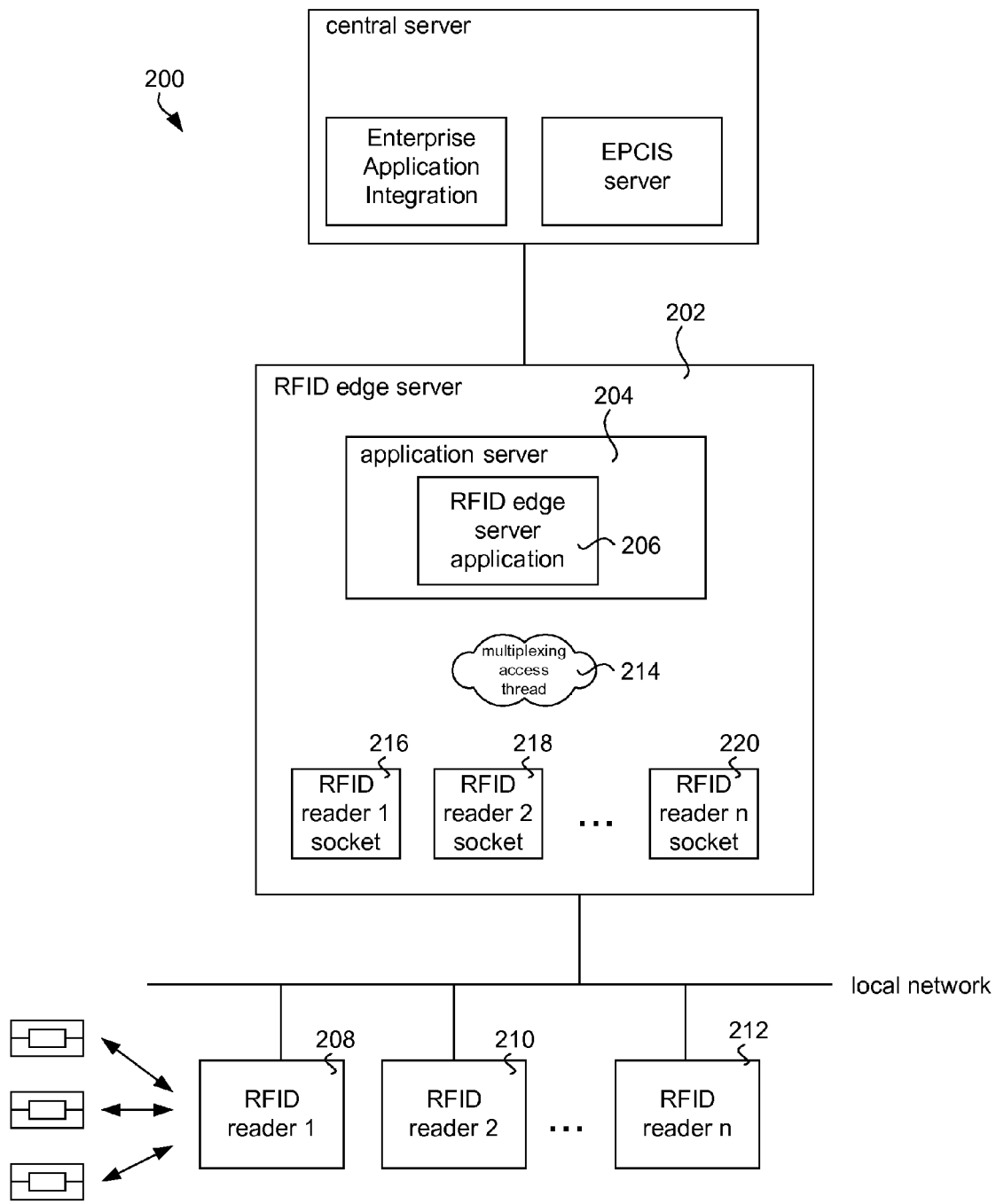
FIG. 2 is a diagram of an RFID edge server using non blocking 10 for reading RFID reader data.

FIG. 2 illustrates an example of a system 200 in which the RFID edge server 202 includes an application server 204 running an RFID edge server application 206. The RFID edge server application 206 can be written in a language such as JAVA™. In one embodiment, the RFID edge server application 206 is written in JAVA™, and the application server 204 is J2EE compliant.

The RFID edge server 202 can have a TCP/IP socket for each of the RFID readers, or each active RFID readers. One way of connecting the RFID edge server 202 with the RFID readers 208, 210 and 212 is to have a dedicated thread for monitoring each socket. In one embodiment, the number of RFID readers, n, can be quite large. It is feasible for large warehouses to have over a hundred RFID readers. For this reason, the RFID edge server 202 can be input/output (I/O)

constrained. Each of the access threads needs to access a CPU and other Operating System Resources which require a certain amount of setup for each access thread. The switching between a large number of threads can limit the number of RFID readers that can be associated with an RFID edge server.

As shown in FIG. 2, in one embodiment, the RFID edge server 202 is associated with multiple RFID readers 208, 210 and 212. RFID edge server 202 can include an application server 204 to run applications, such as the RFID edge server application 206. The RFID edge server 202 can have TCP/IP socket connections 216, 218 and 220 with multiple RFID readers 208, 210 and 212. The RFID edge server 202 can have fewer access threads 214 for the RFID readers than there are socket connections.

Each data access thread can be used to service multiple sockets. In one embodiment, at least some of the access threads 214 are written in a non JAVA™ language. For example, the access thread 214 can be written in code that is native to the machine.

The operating system for the machine running the application server 204 can be such that it will provide TCP/IP socket information to access thread 214 which can then be provided to the application server 204 for use by the RFID edge server application 206. Alternately, the operation for the machine can allow the application server 204 to obtain the low level control of the TCP/IP sockets using the access thread 214.

In one embodiment, the RFID readers 208, 210 and 214 are connected to the RFID edge server 202 through the local network 222. The TCP/IP protocol can be used for interconnecting between the RFID edge server 202 and RFID readers 208, 210 and 212.

In one embodiment, the system can use sockets which are serviced by multiplexed reader/accessor threads. Muxer sockets can support asynchronous network I/O for the upper protocol layers via a completion based contract. In one embodiment, Protocol layers can implement Muxablesocket as a completion callback and register it with the muxers (via SocketMuxer.register). It can then issue asynchronous read requests to the muxers (via SocketMuxer.read). Under the covers, muxers can perform the network input operations either asynchronously (for OS which supports asynchronous I/O, e.g. I/O completion port on Win2K), or in a non-blocking fashion (for OS which supports non-blocking I/O, e.g. select/poll on Unix platforms, or the JDK 1.4 non-blocking I/O API, which is modeled closely after the select API), or synchronously with polling. To avoid undue copying, data can be read into protocol layers' buffer directly). When the read operation is completed, the muxer can notify the protocol layer via the completion callback (MuxableSocket.dispatch). In the event of any network errors or end of file or timeout reached for the socket, the muxer can notify the protocol layer via an error handler (Muxablesocket.hasException/endOfStream).

In one embodiment the number of access threads used is fixed. The number of or, default number of, access threads can be proportional to the number of CPUs of the machine running the RFID edge server. In one exemplary embodiment, there are two access threads per CPU to access the sockets of the RFID readers.

Figure 3:
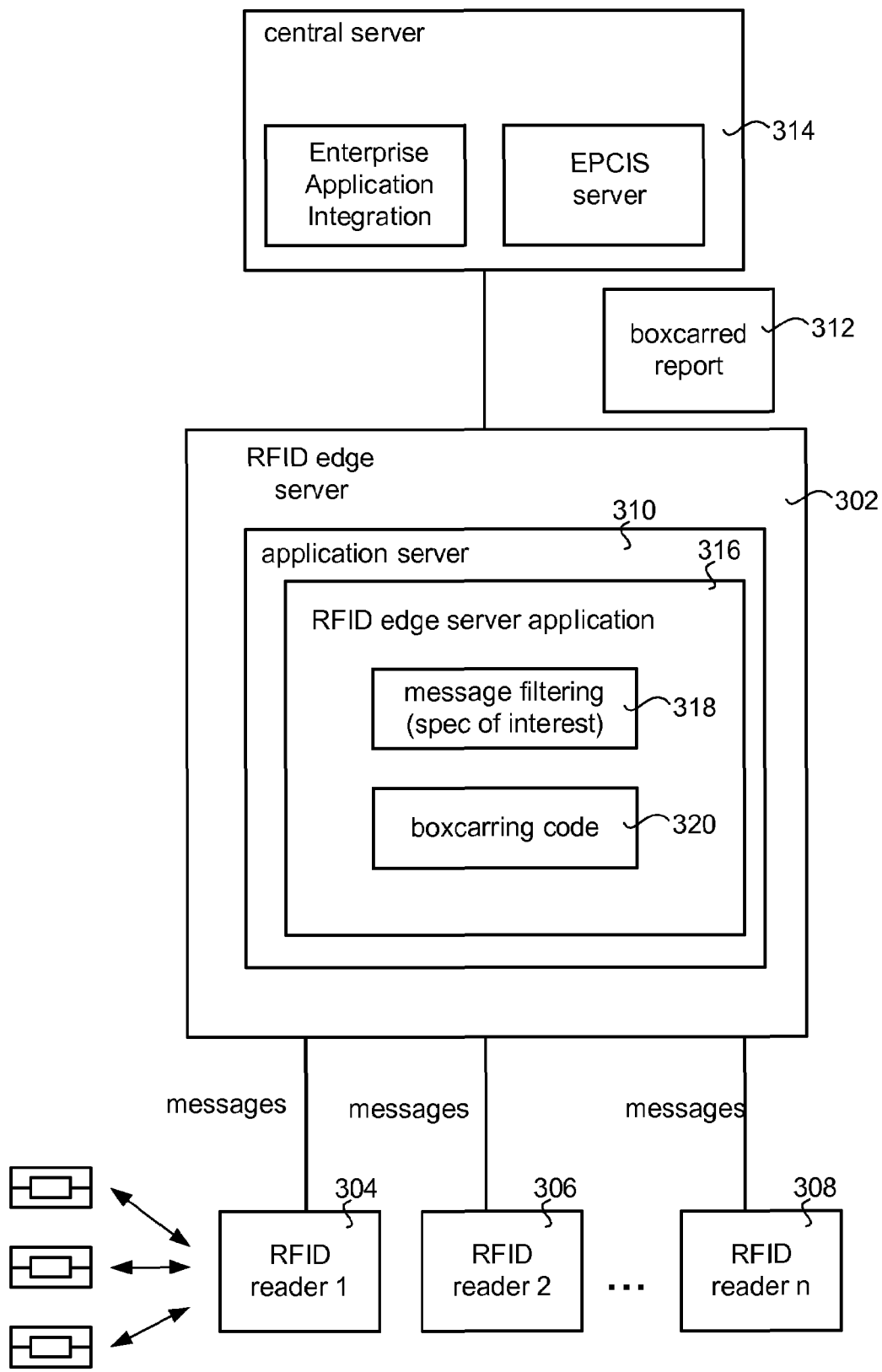
FIG. 3 is a diagram illustrating the use of message filtering and event boxcarring at the RFID edge server.
Figure 4:
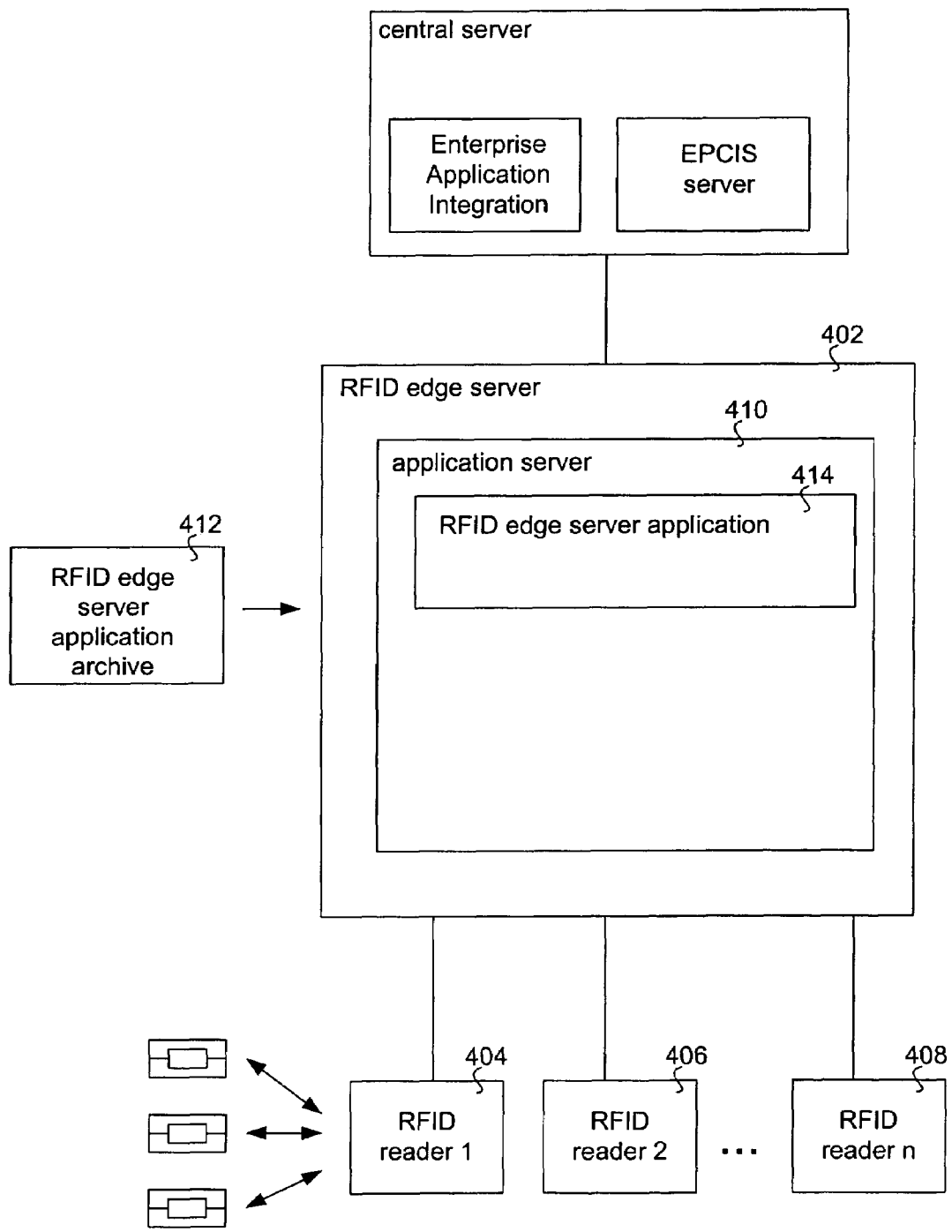
FIG. 4 is a diagram that illustrates the use of an archive to store and create a deployable unit of the RFID edge server itself to be deployed as an application and allow it to be quickly deployed into a standard web server.

FIG. 3 illustrates a RFID edge server 302 used to associate with multiple RFID readers 304, 306 and 308 at a location. The RFID edge server 302 can include an application server 310 which can be adapted to filter communications from the readers 304, 306 and 308 and to boxcar event reports 312 to a central server 314.

In one embodiment, the RFID edge server 302 can have a RFID edge server application running 316 which can include message filtering 318 and boxcar code 320. In one embodiment, messages are received by the RFID edge server. The RFID edge server application 316 can filter away duplicate or otherwise unnecessary reports. In one embodiment, the reports can be boxcarred, that is multiple event reports can be combined together into a single message from the RFID edge server 302 to the central server 314. This can reduce the amount of traffic between the RFID edge server 302 and the central server 314, and thus increase the number of RFID edge servers that can interact with the central server 314. The boxcarred reports can include data from messages provided by the RFID readers 304, 306 and 308. The central server 314 can unboxcar the messages. A boxcarring protocol at the RFID edge servers and at the central servers that ensures the correct boxcarring and unboxcarring of the messages.

One embodiment of the present invention is a method wherein at the RFID edge server 302, messages are received from RFID readers 304, 306 and 308. The messages are filtered at the RFID edge server 302. Event reports can be boxcarred, which can include the data from the messages and sent to the central server 314.

A computer readable media including code adapted to do the above method can also be used. This code can be part of the RFID edge server application 316 running on the application server 312 of the RFID edge server 302.

An RFID edge server 402 can be associated with multiple RFID readers 404, 406 and 408. The RFID edge server 402 can include an application server 410 adapted to receive an RFID software package as an archive file 412. The application server 410 can open an archive file 412 to install the RFID software 414 into the application server 410. In one embodiment, the archive file is a J2EE standard archive file, such as a JAR file (JAVA™ Archive).

The JAVA™ Archive (JAR) file format can enable the bundling of multiple files into a single archive file. Typically, a JAR file will contain the class files and auxiliary resources associated with applets and applications. The JAR file format can provide many benefits:

Security: The contents of a JAR file can be signed. Users who recognize your signature can then optionally grant your software security privileges it wouldn't otherwise have.

Decreased download time: If an applet is bundled in a JAR file, the applet's class files and associated resources can be downloaded to a browser in a single HTTP transaction without the need for opening a new connection for each file.

Compression: The JAR format allows you to compress your files for efficient storage.

Packaging for extensions: The extensions framework provides a means by which you can add functionality to the JAVA™ core platform, and the JAR file format defines the packaging for extensions.

Package Sealing: Packages stored in JAR files can be optionally sealed so that the package can enforce version consistency. Sealing a package within a JAR file means that all classes defined in that package must be found in the same JAR file.

Package Versioning: A JAR file can hold data about the files it contains, such as vendor and version information.

Portability: The mechanism for handling JAR files is a standard part of the Java™ platform's core API.

The RFID edge server application archive 412 can be provided from a website which can be downloaded into the application server 410 of the RFID edge server 402. The archive file can include large number of other files, such as classes and binaries needed to run an RFID edge server application. The RFID edge server archive 412 can make it easier to obtain and maintain the RFID software 414.

One embodiment of the present invention is a method wherein at the RFID edge server 402, RFID software packaged in an archive file 412 is received. At the RFID edge server 402, the archive file can be opened to install the RFID software 414 into the application server 410. A computer readable medium implementing this method can also be used.

Figure 5:
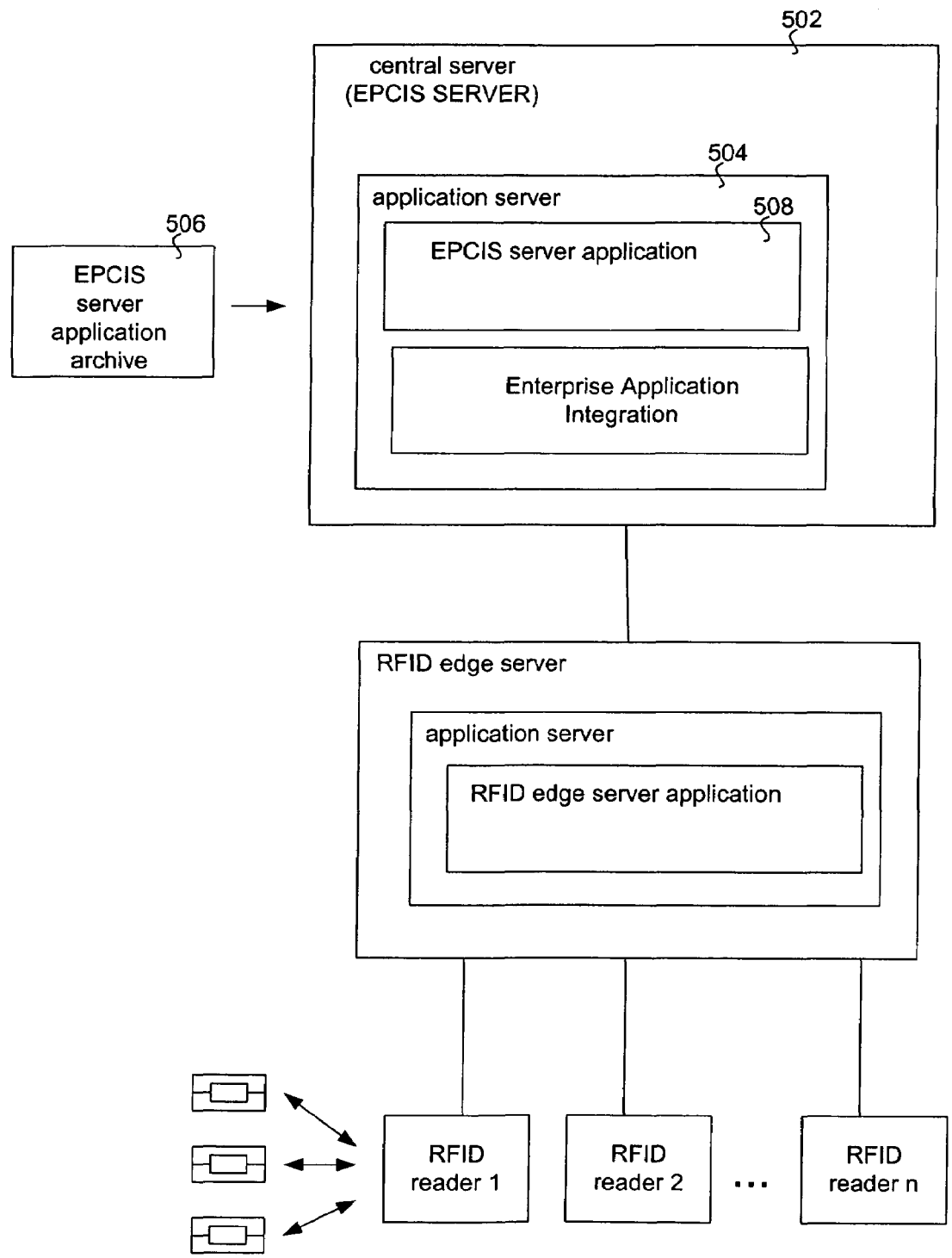
FIG. 5 is a diagram that illustrates an EPCIS server application archive, which allows the EPCIS server application to be deployed in a standards compliant way quickly into a standard J2EE Application Server.

FIG. 5 illustrates an example in which EPCIS server 502 includes an application server 504 set up to receive an EPCIS software package as an archive file 506 and to open archive file to install the EPCIS software 508 into the application server 504. The EPCIS archive file can be a standard archive file such as a JAR file. The use of an EPCIS server application archive 506 can make it easier to obtain and maintain the EPCIS software 508.

On embodiment of the present invention is a method including at an EPCIS server 502, receiving EPCIS software packaged into an archive file 506, and opening the archive file 506 to install the EPCIS software 508 into the application server 504. Additionally, the present invention can comprise a computer readable medium including code adapted to do the steps of the method.

Figure 6:
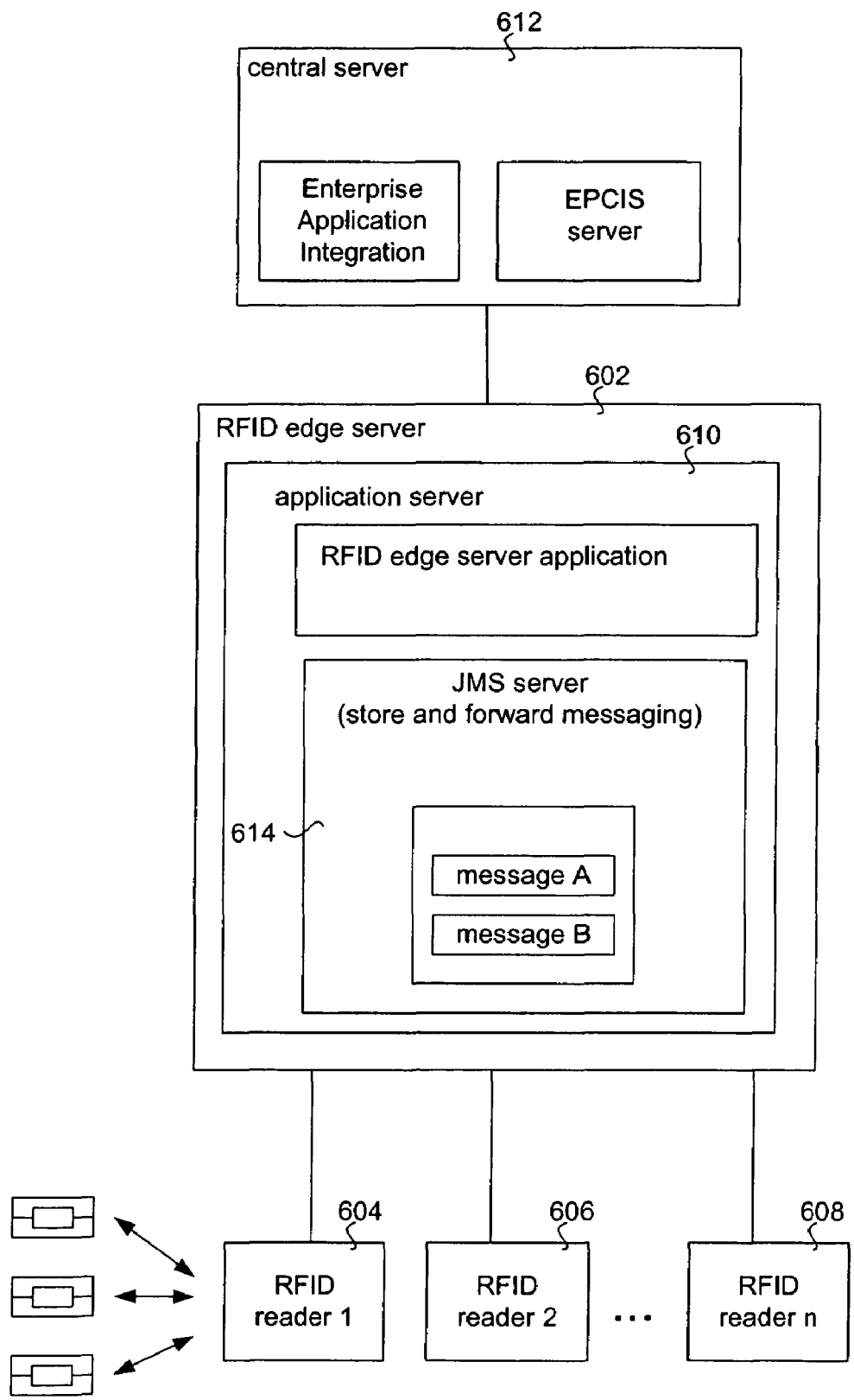
FIG. 6 is a diagram that illustrates the store and forward of messages from the RFID edge server to a notification recipient.

FIG. 6 illustrates an example of an RFID edge server 602 is associated with a multiple RFID readers 604, 606 and 608. The RFID edge server 602 can include an application server 610 adapted to do store-and-forward messaging to a central server 612. A store-and-forward messaging unit can maintain copies of messages sent to the central server 216 until conformation of the messages is received from the central server 612.

Additionally, store and forward messaging can operate in as part of a transaction in which case the message is stored after forwarding until any transaction including the message completes. In one embodiment, the transactional messaging uses a two-phase commit, such as with XA messaging, to ensure that either all updates are done or all the updates are rolled back.

In one embodiment, store and forward messaging is implemented using a JMS server 614. In one embodiment, the JMS server operates in a transactional manner and transactions involving the messages can be rolledback.

The JAVA™ M Message Service is a JAVA™ API that allows applications to create, send, receive, and read messages. The JMS API defines a common set of interfaces and associated semantics that allow programs written in the JAVA™ programming language to communicate with other messaging implementations.

The JMS API enables communication that is not only loosely coupled but also

Asynchronous. A JMS provider can deliver messages to a client as they arrive; a client does not have to request messages in order to receive them.

Reliable. The JMS API can ensure that a message is delivered once and only once. Lower levels of reliability are available for applications that can afford to miss messages or to receive duplicate messages.

In one embodiment, a message, such as message A, is sent to the central server 216 and the RFID edge server 602 maintains a copy of message A until an acknowledgment from the central server 216, or a determination that a transaction including the Message A is completed.

In one embodiment of the present invention a method wherein a RFID edge server 602 receives data from multiple RFID readers 604, 606 and 608. At the RFID reader 602, store and forwarding of messages including at least some of the data is done to the central server 612. A computer readable medium implementing such a method can be used.

Figure 7:
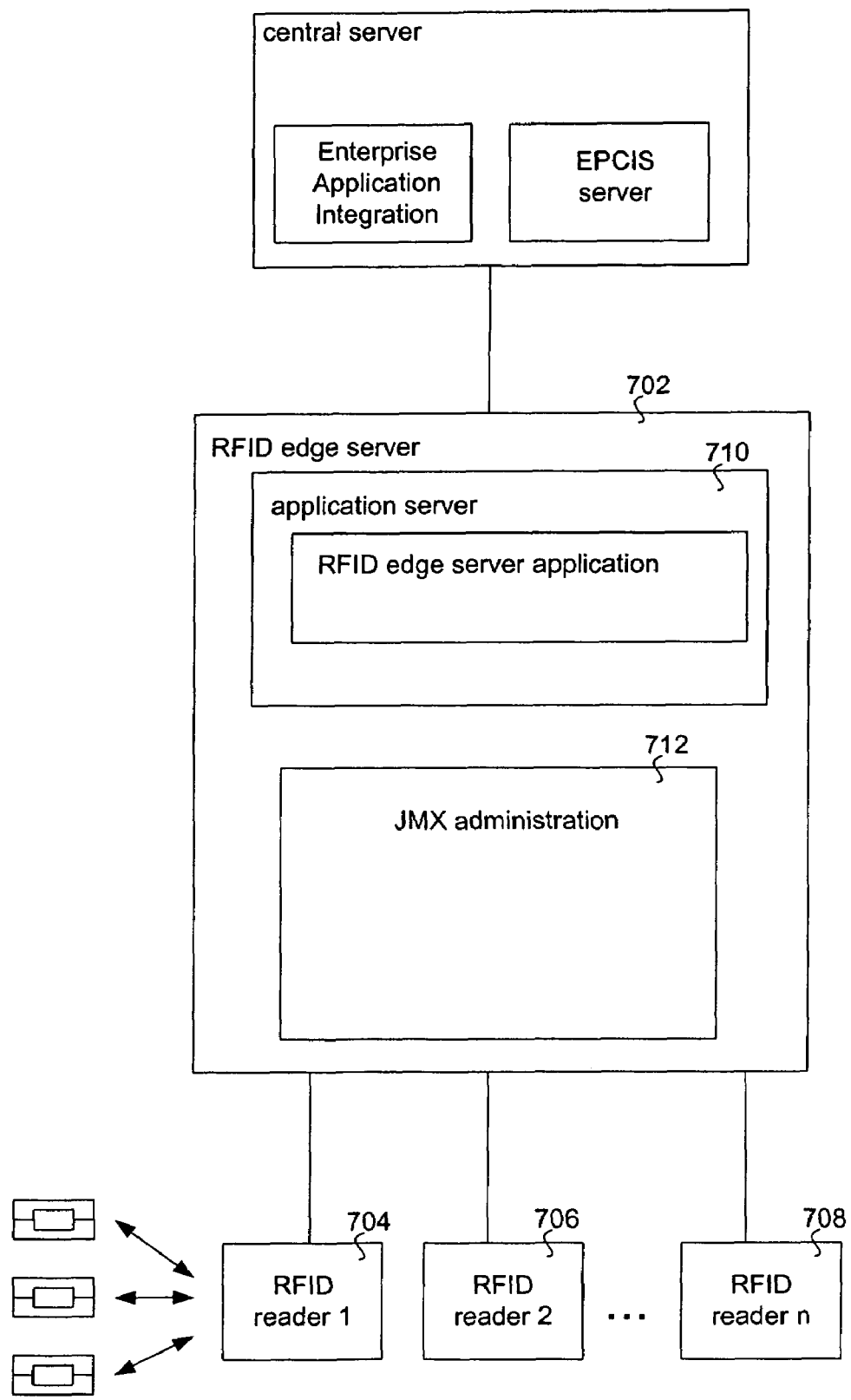
FIG. 7 is a diagram that illustrates JMX administration at a RFID edge server.

FIG. 7 illustrates an RFID edge server application server 702 associate with multiple RFID readers 704, 706 and 708. The RFID edge server 702 can include an application server which is adapted to use JMX administration 712, or some other J2EE standards-based administration.

The JMX administration 712 can be used to manage resources related to the RFID edge server. JAVA™ Management Extensions (JMX) can use managed beans, or MBeans. An MBean is a managed JAVA™ object, similar to a JAVA-Bean™, which follows the design patterns set forth in the instrumentation level of the JMX specification. An MBean can represent a device, an application, or any resource that needs to be managed. MBeans expose a management interface: a set of readable and/or writable attributes and a set of invokable operations, along with a self-description. The management interface does not change throughout the life of an MBean instance. MBeans can also emit notifications when certain defined events occur.

The JMX administration 712 can use MBeans to set configuration for the RFID edge server. An administration server at the RFID edge server 702 can be used to set the configuration of the RFID edge server. The administration server can be run on the application server. An administration console can be used to manage the RFID edge server 702. The administration console can include a graphical interface for determining and setting the state and configuration of the RFID edge server.

The RFID edge server of claim 1, wherein the JMX administration can be used to manage the connections with the multiple RFID readers. The JMX administration can be used to manage the RFID edge server remotely.

Figure 8:
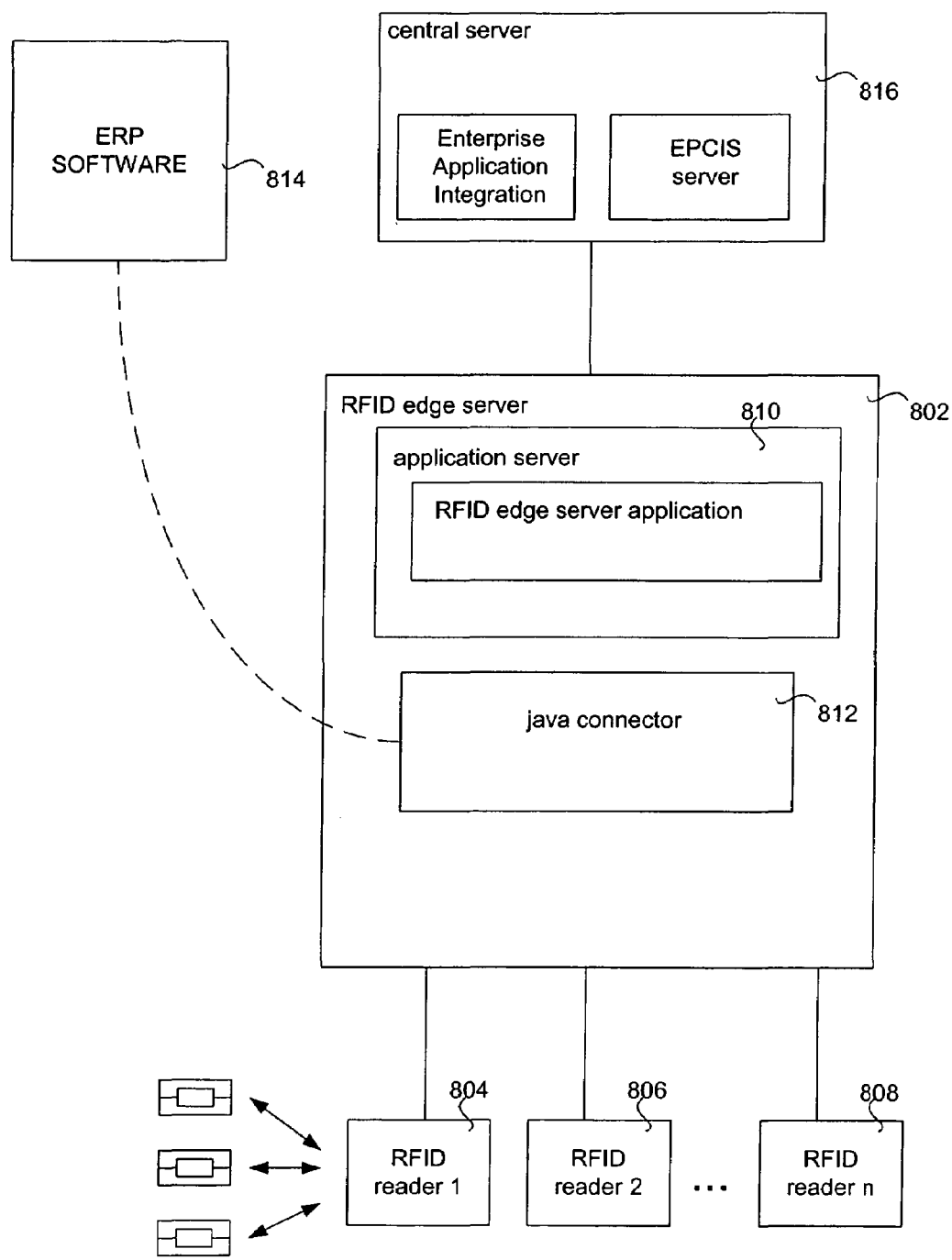
FIG. 8 is a diagram that illustrates the use of in-process JAVA™ connector to connect the RFID edge server to legacy/$3^{rd}$ party software.

FIG. 8 shows one embodiment of the present invention which an RFID edge server 802 is used to associate with multiple RFID readers 804, 806 and 808. RFID edge server 802 includes an application server 810 using a JAVA™ connector 812. The JAVA™ connector can be used to communicate with ERP software 814.

The J2EE Connector (JAVA™ connector) architecture defines a standard architecture for connecting the J2EE platform to heterogeneous (Enterprise Information Systems) EIS systems. Examples of EIS systems include ERP, mainframe transaction processing, database systems, and legacy applications not written in the JAVA™ programming language. The J2EE Connector (JAVA™ connector) architecture defines a set of scalable, secure, and transactional mechanisms to enable the integration of EISs with application servers and enterprise applications.

The J2EE Connector architecture enables an EIS vendor to provide a standard resource adapter for its EIS. The resource adapter plugs into an application server, providing connectivity between the EIS, the application server, and the enterprise application. An EIS vendor needs to provide just one standard resource adapter which has the capability to plug in to any application server that supports the J2EE Connector architecture.

Multiple resource adapters (that is, one resource adapter per type of EIS) are pluggable into an application server. This capability enables application components deployed on the application server to access the underlying EIS systems.

The JAVA™ connector 812 can connect to ERP software at another location. RFID edge server also communicates with an EPCIS server.

Device management functions of the RFID edge server can include Health Monitoring & Diagnostics, Fault Management, Tag Activity Monitoring, Performance Analysis, Analytics to determine underperforming components, Maintenance & Upgrades, Version Control, Firmware & Software upgrades, Provisioning & Configuration, and Web based configuration.

Figure 9:
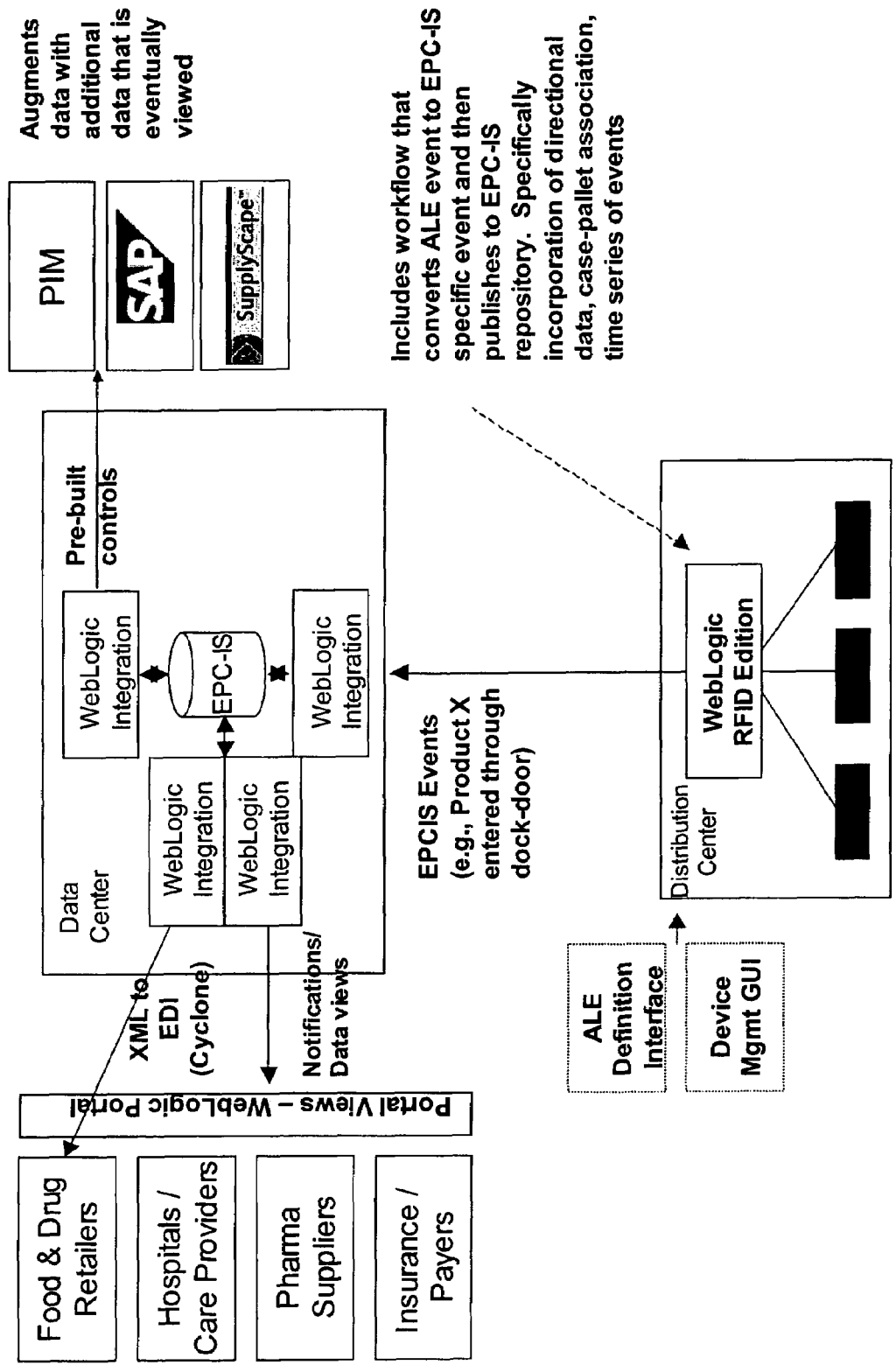
FIG. 9 is a diagram that illustrates an exemplary system of one embodiment.

FIG. 9 shows an exemplary system of one embodiment. An application server at a distribution center can run application(s) including an ALE definition interface, A device management GUI and workflows to convert ALE events to EPCIS specific events that can be published to an EPCIS repository. A data center can include integration software to integrate with ERP software and provide data to web sites which can use a portal product.

Figure 12:
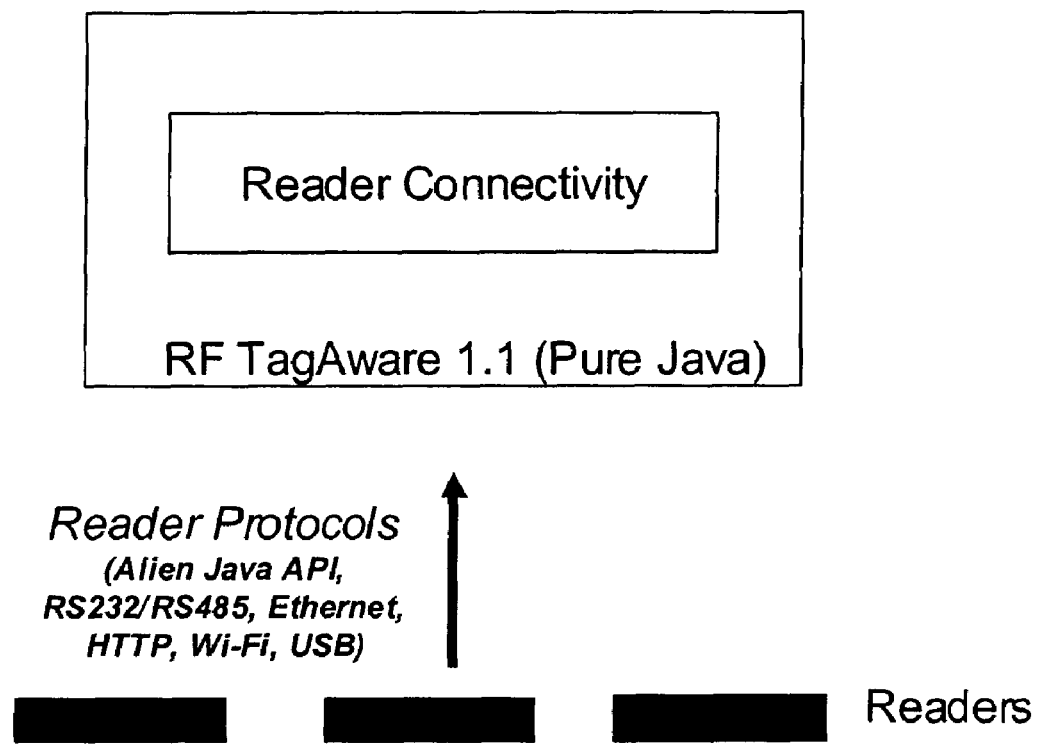
FIG. 12 is a diagram that illustrates reader connectivity.

FIG. 12 illustrates the use of reader connectivity software that can be run at an application server at an RFID edge server. A number of different reader protocols can be supported which can allow a single RFID edge server interact with multiple different types of RFID readers.

The use of the systems of the present invention can have a number of advantages.

1) Scalability—RFID systems can have hundreds of RFID readers each reading data hundreds of times a second. This can cause CPU utilization, network bandwidth, and/or data repository constraints. A number of features can help this problem including: Thread Multiplexing, "Non-blocking" IO, Eliminating duplicates through ALE, "Boxcarring" packets and Handling data storage at the Enterprise Application Integration (EAI) layer.

2) Availability—Availability of the system can be improved by reducing dependency on the database at the edge and ensuring availability of integration/server layer. In one embodiment, a file system and not a database is used at the RFID edge server. A database can be used at an integration layer, such as at a central server. Load balancers can be used as well as high-availability messaging through clustered JMS servers. A clustered database can be used to back" the integration/server layer.

3) Security—Administration should be secure to prevent readers from being turned off and items being stolen. The administrative interface can be protected by authentication, authorization, audit, and potentially over SSL (Secure Socket Layer). This SSL "handshake" can be very CPU intensive. Alternately, the entire stack (reader/edge/server) can be wrapped in a firewall to enable perimeter authorization. The RFID system security can be plugable to $3^{rd}$ party security providers.

4) Interoperability—Interoperability can include interoperability with packaged applications and with readers, Support for standards-based JCA Adapters. Reader abstraction layer at the edge that readily facilitates device drivers additions and updates.

5) Integration Layer—The Global view is difficult to support due to different readers and "edge-server" formats. Complex event composition is costly and not suitable at CPU intensive edge (transformation and duplicate elimination). The RFID edge-server need not be designed to integrate with other components of an integrated software platform. A unifying EAI layer can be used to compose and correlate events from different sets of RFID infrastructure. Clustered integration servers can be used to absorb the load of complex event composition. The EAI product can be fully integrated with Business Process Management (BPM) and Portal.

6) Administration—Different administration consoles from different components can prevent a centralized administration. RFID components can integrate with existing management vendors (HP Openview, Tivoli) and can support protocols like SNMP & JMX.

7) Messaging—Once RFID becomes mission critical there can be a need to ensure messages are sent once and only once. The JMX embodiment can support "exactly once" semantics. Transaction can guarantee on message enqueue & dequeue. The RFID edge server can provide asynchronous JMS support.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An RFID (Radio Frequency Identification) edge server comprising:
   at least one processor to associate with multiple RFID readers at a location; and
   an application server to run applications; and
   socket connections with the multiple RFID readers, the RFID edge server having fewer access threads for the RFID readers than there are said socket connections, wherein at least one single access thread is used to service multiple socket connections; and
   at least one upper protocol layer that establishes a completion-based contract with the socket connections by registering with a socket muxer, wherein after registering, the upper protocol layer issues asynchronous read requests to the socket muxer according to the completion-based contract, and wherein the socket muxer performs network input/output (I/O) operations in the background by loading data directly into a buffer of said upper protocol layer and wherein once the read operation is completed, the socket muxer notifies the upper protocol layer via a completion callback according to the completion-based contract.

2. The RFID edge server of claim 1, wherein at least some of the access threads are written in a first language.

3. The RFID edge server of claim 2, wherein the application server runs applications written in a second language.

4. The RFID edge server of claim 1, wherein the RFID edge server and at least some of the RFID readers are interconnected using a local network.

5. The RFID edge server of claim 1, wherein the application server of the RFID edge server runs on top of an operating system.

6. The RFID edge server of claim 1, wherein the access threads are native to the operating system running in the RFID server.

7. The RFID edge server of claim 1, wherein there are a fixed number of access threads.

8. The RFID edge server of claim 1, wherein the number of access threads is proportional to the number of CPUs (Central Processing Unit) of the RFID edge server.

9. The RFID edge server of claim 1, wherein the number of access threads is set to be double a number of CPU's (Central Processing Units) of the RFID edger server.

10. The RFID edge server of claim 1, wherein a number of multiple RFID readers that can associate with the RFID edge server is increased by reducing the number of access threads for said socket connections and by reducing the number of socket connections for the RFID readers.

11. The RFID edge server of claim 1, wherein the socket muxer performs said network I/O operations depending on attributes of an operating system, such that the socket muxer reads asynchronously for operating systems that support asynchronous I/O operations, in a non-blocking fashion for operating systems that support non-blocking I/O, or synchronously with polling.

12. The RFID edge server of claim 1, wherein the socket connections are transmission control protocol/internet protocol (TCP/IP) socket connections.

13. A system for providing a radio frequency identification (RFID) edge server with socket multiplexing, said system comprising:
an RFID edge server having at least one processor to associate with multiple RFID readers at a location;
an application server located on the RFID edge server for executing applications; and
socket connections with the multiple RFID readers, the RFID edge server having fewer access threads for the RFID readers than there are said socket connections, wherein at least one single access thread is used to service multiple socket connections; and
at least one upper protocol layer that establishes a completion-based contract with the socket connections by registering with a socket muxer, wherein after registering, the upper protocol layer issues asynchronous read requests to the socket muxer according to the completion-based contract, and wherein the socket muxer performs network input/output (I/O) operations in the background by loading data directly into a buffer of said upper protocol layer and wherein once the read operation is completed, the socket muxer notifies the upper protocol layer via a completion callback according to the completion-based contract.

14. A method for providing a radio frequency identification (RFID) edge server with socket multiplexing, said method comprising:
associating an RFID edge server having at least one processor with multiple RFID readers at a location;
providing an application server on the RFID edge server for executing applications; and
establishing one or more socket connections with the multiple RFID readers, the RFID edge server having a fewer access threads for the RFID readers than there are said socket connections, wherein at least one single access thread is used to service multiple socket connections; and
establishing a completion-based contract between an upper protocol layer of the RFID edge server and the socket connections by registering the upper protocol layer with a socket muxer, wherein after registering, the upper protocol layer issues asynchronous read requests to the socket muxer according to the completion-based contract, and wherein the socket muxer performs network input/output (I/O) operations in the background by loading data directly into a buffer of said upper protocol layer and wherein once the read operation is completed, the socket muxer notifies the upper protocol layer via a completion callback according to the completion-based contract.

15. The method of claim 14, further comprising:
increasing a number of multiple RFID readers that can associate with the RFID edge server by reducing the number of access threads for said socket connections and by reducing the number of socket connections for the RFID readers.

16. The method of claim 14, wherein the socket muxer performing the network I/O operations further includes:
reading asynchronously by the socket muxer for operating systems that support asynchronous I/O operations; or
reading in a non-blocking fashion by the socket muxer for operating systems that support non-blocking I/O; or
reading synchronously with polling by the socket muxer.

17. The method of claim 14, wherein the socket connections are transmission control protocol/internet protocol (TCP/IP) socket connections.

* * * * *

UNITED STATES PATENT AND TRADEMARK OFFICE
CERTIFICATE OF CORRECTION

PATENT NO. : 7,660,890 B2  Page 1 of 2
APPLICATION NO. : 11/232622
DATED : February 9, 2010
INVENTOR(S) : Ashok Banerjee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Drawing sheet 9 of 12, in Figure 9, below WebLogic, line 1, delete "EPC-IS" and insert -- EPCIS --, therefor.

Drawing sheet 9 of 12, in Figure 9, below SupplyScape, line 2, delete "EPC-IS" and insert -- EPCIS --, therefor.

Drawing sheet 9 of 12, in Figure 9, below SupplyScape, line 4, delete "EPC-IS" and insert -- EPCIS --, therefor.

In column 1, line 8, delete "Banjerjee," and insert -- Banerjee, --, therefor.

In column 1, line 8, delete "2005 ." and insert -- 2005. --, therefor.

In column 1, line 29, after "for" delete "a".

In column 1, line 57, delete "10" and insert -- IO --, therefor.

In column 2, line 28, after "include" delete "a".

In column 2, line 51, delete "The" and insert -- the --, therefor.

In column 2, line 64, after "file" insert -- . --.

In column 3, line 2, after "processing" insert -- . --.

Signed and Sealed this

Twelfth Day of October, 2010

David J. Kappos
*Director of the United States Patent and Trademark Office*

CERTIFICATE OF CORRECTION (continued)
U.S. Pat. No. 7,660,890 B2

In column 3, line 54, delete "RFBD" and insert -- RFID --, therefor.

In column 5, line 18, delete "non JAVA™" and insert -- non-Java --, therefor.

In column 6, line 62, delete "Java™" and insert -- JAVA™ --, therefor.

In column 9, line 8, delete "interface," and insert -- interface. --, therefor.

In column 11, line 30, in claim 9, delete "edger" and insert -- edge --, therefor.